United States Patent
Ikeda et al.

(10) Patent No.: US 7,478,671 B2
(45) Date of Patent: Jan. 20, 2009

(54) HEATING APPARATUS FOR CABIN OF CONSTRUCTION EQUIPMENT

(75) Inventors: Toshimichi Ikeda, Changwon (KR); Chan Ju Na, Changwon (KR); Kyu Cheon Jeong, Changwon (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 549 days.

(21) Appl. No.: 11/070,423

(22) Filed: Mar. 2, 2005

(65) Prior Publication Data

US 2006/0081365 A1    Apr. 20, 2006

(30) Foreign Application Priority Data

Oct. 15, 2004    (KR) .................... 10-2004-0082541

(51) Int. Cl.
*B60H 1/00* (2006.01)
(52) U.S. Cl. .................... 165/296; 165/202
(58) Field of Classification Search ............ 165/41, 165/42, 43, 44; 181/68.1, 204
See application file for complete search history.

(56) References Cited

U.S. PATENT DOCUMENTS

| 4,069,972 | A |   | 1/1978 | Hausmann |  |
|---|---|---|---|---|---|
| 4,081,050 | A | * | 3/1978 | Hennessey et al. | 180/68.1 |
| 4,352,456 | A |   | 10/1982 | Brandenburg, Jr. |  |
| 6,192,839 | B1 | * | 2/2001 | Takeshita et al. | 165/41 |
| 7,131,422 | B2 | * | 11/2006 | Kimura et al. | 181/204 |

FOREIGN PATENT DOCUMENTS

| DE | 101 51 910 | 4/2003 |
|---|---|---|
| EP | 0 668 177 | 8/1995 |

* cited by examiner

*Primary Examiner*—Ljiljana (Lil) V Ciric
(74) *Attorney, Agent, or Firm*—Ladas and Parry LLP

(57) ABSTRACT

A heating apparatus for a cabin of a construction equipment in which hot air ejected from an oil cooler is used for heating in the winter while it is ejected out in the summer, to maximize cooling or heating efficiency of the cabin of the construction equipment. The heating apparatus for a cabin of a construction equipment includes a duct ejecting air ejected from an oil cooler provided inside an automotive body at the rear of the cabin to the outside of the automotive body, and a switching unit provided in the duct to open and close an air vent in the duct, guiding the air inside the duct to the rear of the cabin if it is opened. The heating apparatus is automatically operated depending on its peripheral temperature condition to maximize cooling or heating efficiency of the cabin.

9 Claims, 5 Drawing Sheets

HEATING APPARATUS FOR CABIN OF CONSTRUCTION EQUIPMENT

CROSS-REFERENCE TO RELATED APPLICATIONS

This application claims benefit under 35 U.S.C. § 119 from Korean Patent Application No. 2004-82541, filed on Oct. 15, 2004, the entire content of which is incorporated herein by reference.

BACKGROUND OF THE INVENTION

1. Field of the Invention

The present invention relates to a heating apparatus for a cabin of a construction equipment, and more particularly to, a heating apparatus for a cabin of a construction equipment in which hot air ejected from an oil cooler is used for heating in winter while it is ejected out in summer to maximize cooling or heating efficiency of the cabin of the construction equipment.

2. Description of the Related Art

FIG. 1 and FIG. 2 illustrate an excavator that is a representative construction equipment. FIG. 1 is a side view illustrating a general excavator, and FIG. 2 is an arrangement view of parts provided around an engine of an excavator.

Generally, an excavator 100 includes a lower traveling structure 102, an upper swing structure 101 rotatably provided on the lower traveling structure 102, a working device 103 operationally provided above the upper swing structure 101, and a cabin 118.

An engine room 104 is provided at the rear of the upper swing part 101, and an engine 105 is provided inside the engine room 104 to drive a pump 106 and a cooling fan 108. The pump 106 is supplied with hydraulic oil from a hydraulic tank 117 and discharges the hydraulic oil to a pipe 109. The discharged hydraulic oil is input to a control valve 110. The control valve 110 discharges the hydraulic oil to an actuator 111 if necessary to drive the actuator 111.

The hydraulic oil ejected from the control valve 110 reaches high temperature as its temperature ascends. Therefore, an oil cooler 112 serves to cool the hydraulic oil of high temperature. An oil cooling fan 114 of the oil cooler 112 is driven by a driving source 115, such as a hydraulic motor or an electric motor, to cool the hydraulic oil. The hydraulic oil cooled by the oil cooler 112 returns to the hydraulic tank 117 through a pipe 116. Cooling water that cools the engine 105 flows into a radiator 113 so that cooling is performed by the cooling fan 108 driven by the engine 105.

FIG. 3 is a plane view of an excavator illustrating the state that it is provided with an oil cooler according to the related art, and FIG. 4 is a rear view of an excavator shown in FIG. 3.

The oil cooler of the excavator is provided inside one side of an automotive body 120 at the rear of the cabin 118. Air input from the outside of the automotive body 120 to the oil cooler 112 is diffused into the automotive body 120 and is finally ejected to the outside of the automotive body 120 through an air vent 120a at the upper portion of the automotive body 120. As shown, air flow inside the automotive body 120 reaches the rear side of the cabin 118. Since the air ejected from the oil cooler 112 is maintained at high temperature of 70° C., the hot air of the oil cooler 112 serves to heat the cabin 118.

The hot air of the oil cooler 112 is helpful for heating of the cabin 118 in winter. However, there exists a problem in that the hot air of the oil cooler 112 deteriorates cooling efficiency of the cabin 118 in summer.

SUMMARY OF THE INVENTION

Accordingly, the present invention is directed to a heating apparatus for a cabin of a construction equipment that substantially obviates one or more problems due to limitations and disadvantages of the related art.

An object of the present invention is to provide a heating apparatus for a cabin of a construction equipment in which hot air ejected from an oil cooler is used for heating in winter while it is ejected out in summer so as not to deteriorate cooling efficiency.

Another object of the present invention is to provide a heating apparatus for a cabin of a construction equipment in which the heating apparatus is automatically operated depending on its peripheral temperature condition to maximize cooling or heating efficiency of the cabin.

Other object of the present invention is to provide a heating apparatus for a cabin of a construction equipment in which hot air flow ejected from an oil cooler is changed as a driver of the construction equipment manipulates a switch.

To achieve these objects and other advantages and in accordance with the purpose of the invention, as embodied and broadly described herein, a heating apparatus for a cabin of a construction equipment provided with an oil cooler inside an automotive body at the rear of the cabin includes a duct ejecting air ejected from the oil cooler to the outside of the automotive body, and a switching means provided in the duct to open and close, guiding the air inside the duct to the rear of the cabin if it is opened.

Preferably, the switching means is made of a plate material fixed to the duct by a fitting means.

Preferably, the switching means is made of a plate material rotatably hinged on the duct.

Preferably, the switching means includes at least one of more wings rotatably hinged on the duct.

The switching means is connected with a controller to be driven by a control signal and the controller opens and closes the switching means depending on temperature information sensed by a temperature sensor.

The switching means is connected with a switch provided in the cabin and is opened and closed as the switch is manipulated.

The duct includes an outlet ejecting air ejected from the oil cooler to the outside of the automotive body and an air vent guiding the air toward the rear of the cabin.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
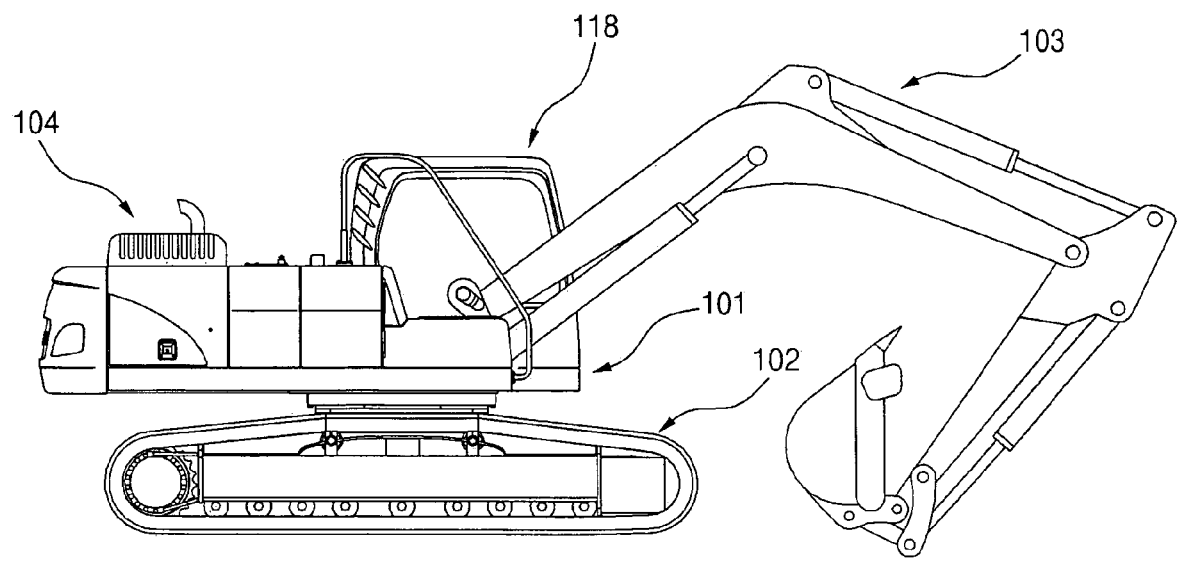
FIG. 1 is a side view illustrating a general excavator.
Figure 2:
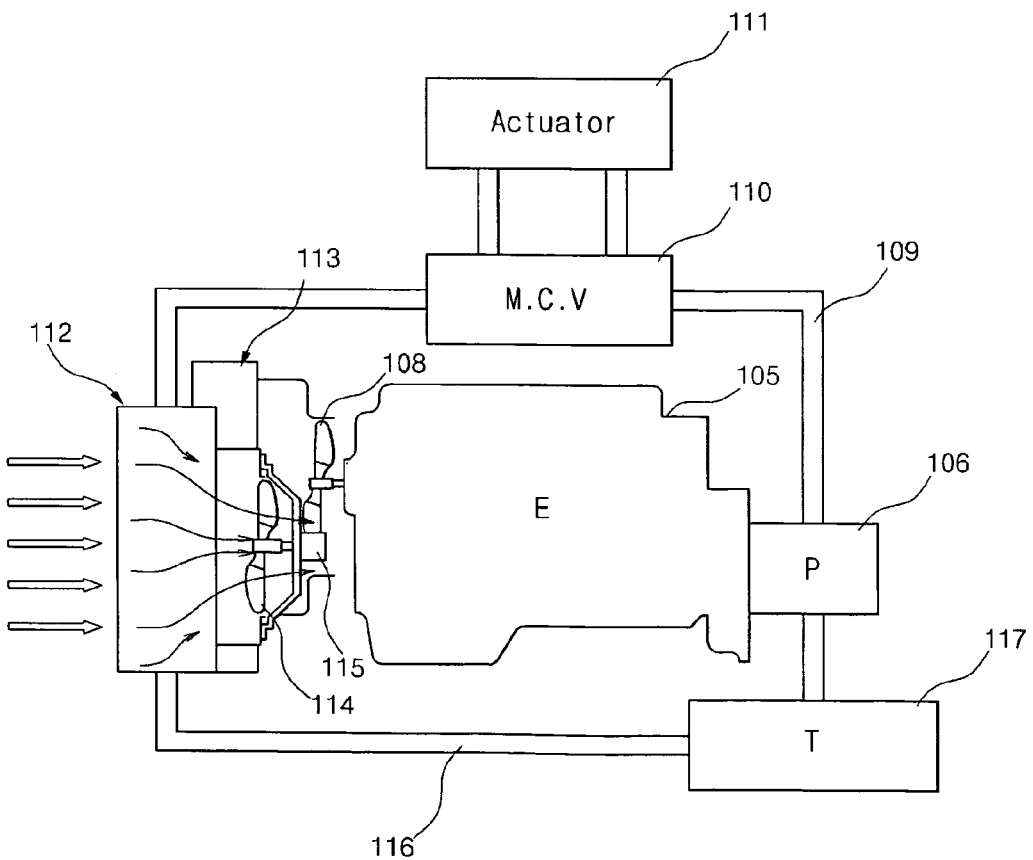
FIG. 2 is an arrangement view of parts provided around an engine of an excavator.
Figure 3:
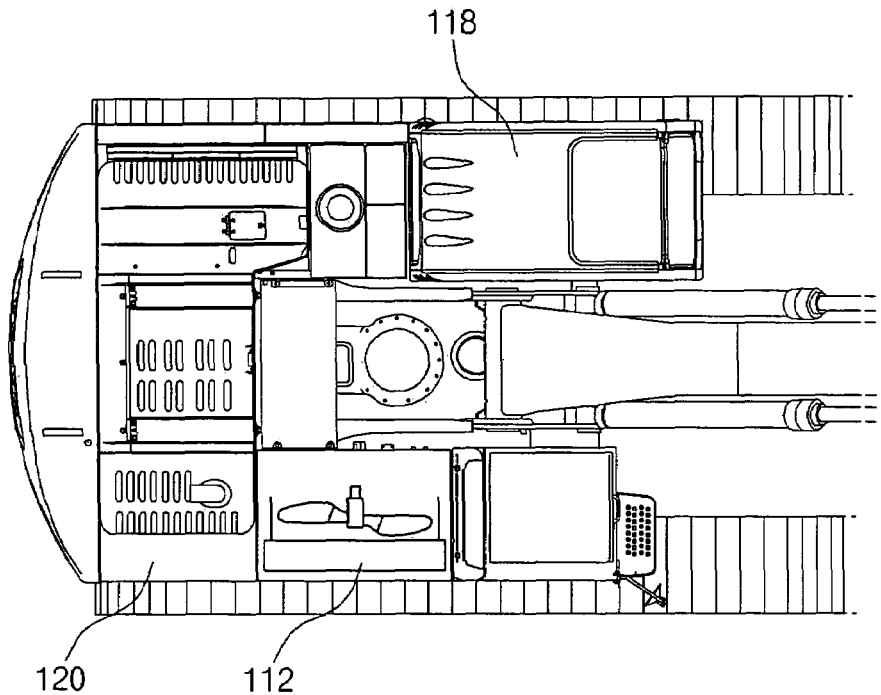
FIG. 3 is a plane view of an excavator illustrating the state that it is provided with an oil cooler according to the related art.
Figure 4:
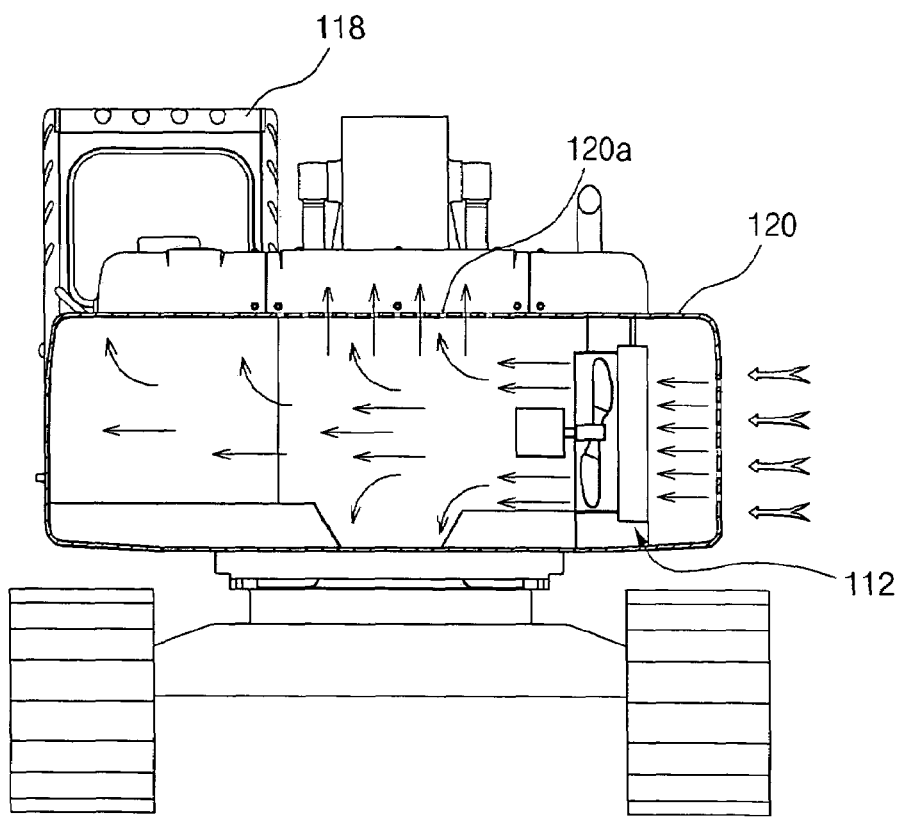
FIG. 4 is a rear view of an excavator shown in FIG. 3.
Figure 5:
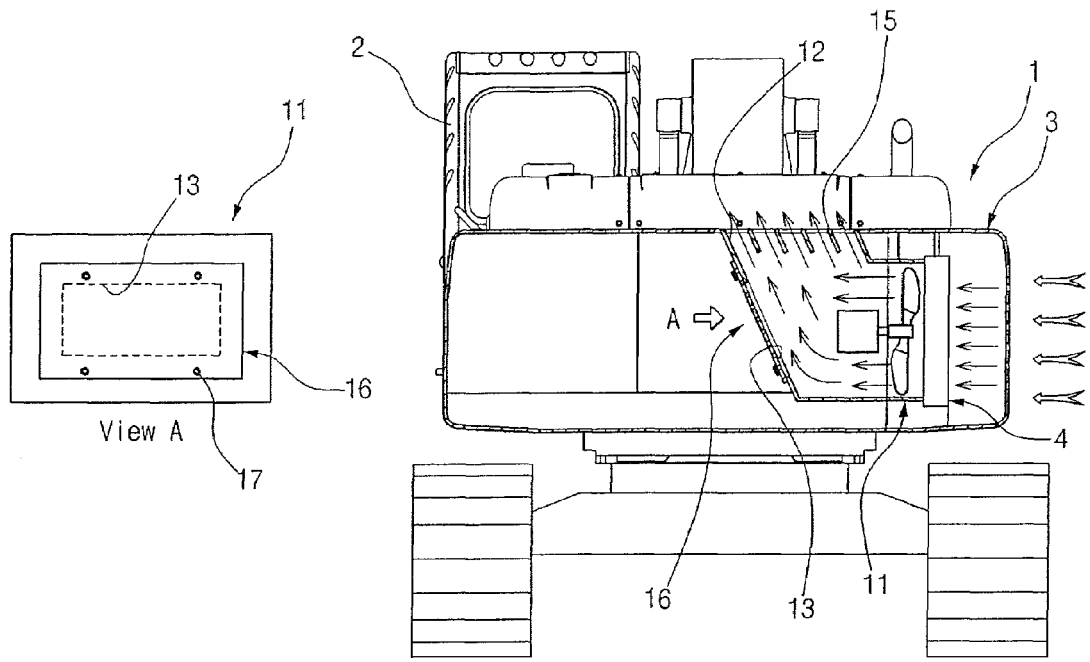
FIG. 5 is a rear view of a construction equipment provided with a heating apparatus for a cabin according to the first embodiment of the present invention.
Figure 6:
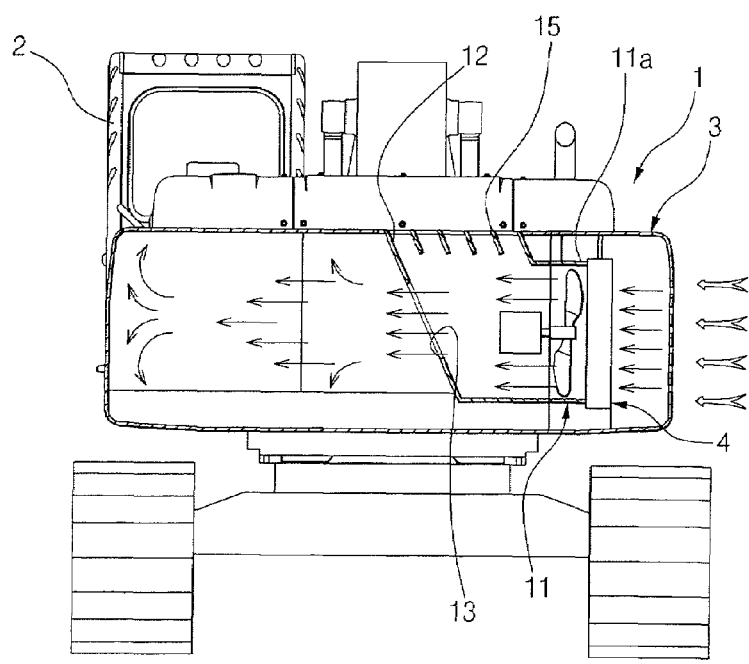
FIG. 6 is a state view illustrating the state that a heating apparatus for a cabin of a construction equipment according to the first embodiment of the present invention is used in winter.
Figure 7:
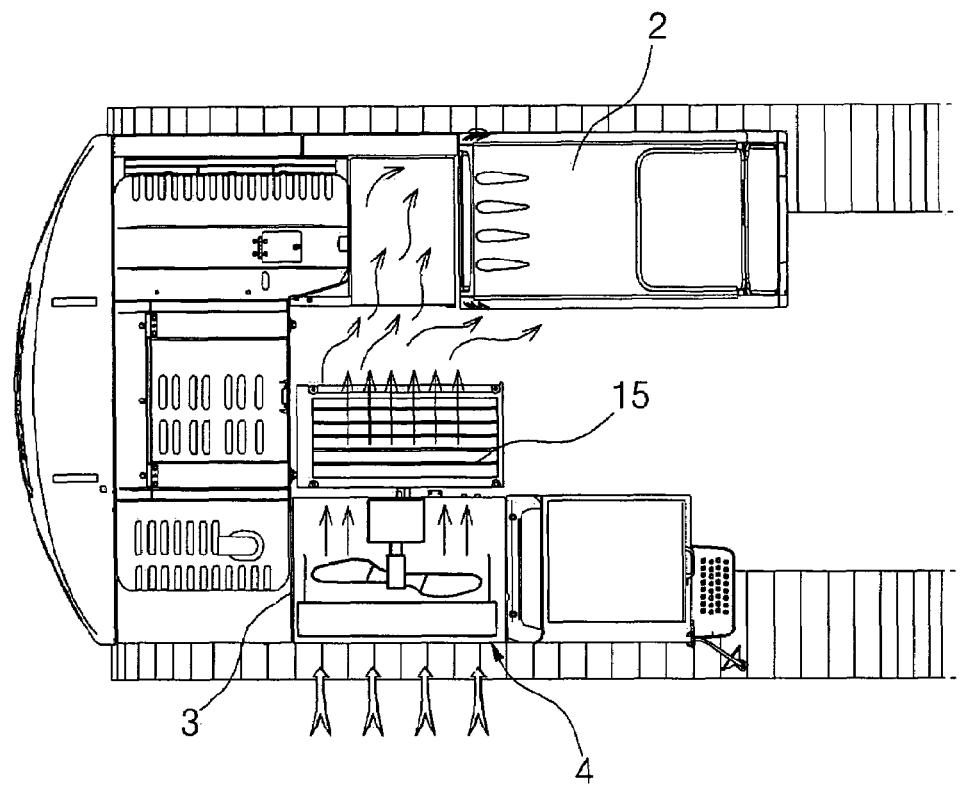
FIG. 7 is a plane view of a construction equipment shown in FIG. 6.

FIG. 5 is a rear view of a construction equipment provided with a heating apparatus for a cabin according to the first embodiment of the present invention, FIG. 6 is a state view illustrating the state that a heating apparatus for a cabin of a construction equipment according to the first embodiment of the present invention is used in winter, and FIG. 7 is a plane view of a construction equipment shown in FIG. 6.

A heating apparatus 1 for a cabin 2 of a construction equipment is provided inside an automotive body 3 at the rear of the cabin 2. The heating apparatus 1 serves to allow hot air ejected from an oil cooler 4 to be used for heating in winter while it serves to allow the hot air to be ejected out in summer, thereby failing to deteriorate cooling efficiency.

The heating apparatus 1 includes a duct 11 and a switching means 16 provided in the duct 11 to open and close.

The duct 11 is connected with the oil cooler 4 provided inside the automotive body 3 at the rear of the cabin 2 and guides air ejected from the oil cooler 4 to the outside or the inside of the automotive body 3. The duct 11 includes an outlet 12 ejecting the air ejected from the oil cooler 4 to the outside of the automotive body 3 and an air vent 13 guiding the air ejected from the oil cooler 4 to the rear of the cabin 2 inside the automotive body 3. Preferably, a grill 15 is provided in the outlet 12 of the duct 11 to guide the air flow to the outside of the automotive body 3. The duct also includes an inlet 11a, shown in FIG. 6.

The switching means 16 is provided in the air vent 13 of the duct 11 to open and close and selectively opens or closes the air vent 13. That is, the switching means 16 closes the air vent 13 if the construction equipment is used in summer while the switching means 16 opens the air vent 13 if the construction equipment is used in winter.

The switching means 16 is made of a rectangular plate material to cover the air vent 13 and is provided with through holes at four corners. The switching means 16 is fixed to the air vent 13 by a fitting means such as a bolt 17 through the through holes. Therefore, in a state that the switching means 16 is fixed to the air vent 13, the air ejected from the oil cooler 4 is not ejected toward the cabin 2 inside the automotive body 3 but guided toward the upper portion of the automotive body 3 to be ejected out.

In summer, a driver of the construction equipment allows the hot air of the oil cooler 4 not to flow toward the rear of the cabin 2 inside the automotive body 3 by fitting the switching means 16 to the air vent 13 of the duct 11, thereby failing to deteriorate cooling efficiency of the cabin 2. Also, in winter, the driver allows the air of the oil cooler 4 to flow toward the rear of the cabin 2 by releasing the bolt 17 to detach the switching means 16 from the air vent 13 of the duct 11 to open the air vent 13, thereby maximizing heating efficiency of the cabin 2.

Figure 8:
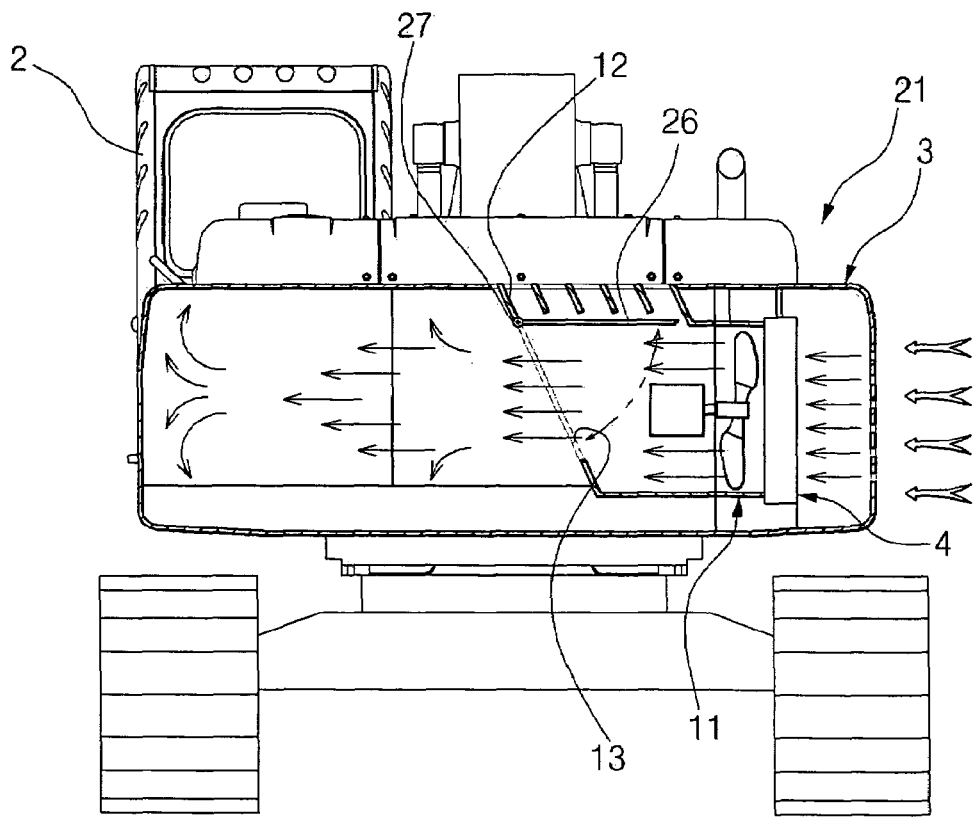
FIG. 8 is a rear view of a construction equipment provided with a heating apparatus for a cabin according to the second embodiment of the present invention.

FIG. 8 is a rear view of a construction equipment provided with a heating apparatus for a cabin according to the second embodiment of the present invention.

A rectangular plate shaped switching means 26 is rotatably hinged on the air vent 13 in the duct 11 of the heating apparatus 21 according to the second embodiment of the present invention.

The switching means 26 has a plate shape with a width that covers the air vent 13 and is rotatably hinged on the air vent 13 around the upper portion of the air vent 13. As shown, since the switching means 26 is rotatably hinged on the air vent 13 by a pivot pin 27, the driver downward rotates the switching means 26 to close the air vent 13 if the construction equipment is used in summer while the driver upward rotates the switching means 26 to open the air vent 13 if the construction equipment is used in winter. Thus, the switching means of the second embodiment functions as that of the first embodiment.

In the second embodiment of the present invention, the outlet 12 of the duct 11 is closed by the switching means 26 when the air vent 13 is opened as the switching means 26 is upward rotated. In this case, more air ejected from the oil cooler 4 flows toward the cabin 2 to enhance heating efficiency.

Although not shown, the switching means 26 is driven by a driving means such as an electric motor so that it is rotatably hinged on the air vent 13. The driving means is driven by a controller depending on external temperature sensed by a temperature sensor, so that the switching means 26 is automatically operated in response to temperature condition of the construction equipment. Alternatively, a separate switch that operates the driving means may be provided in the cabin 2 to allow the driver to operate the switching means 26.

Figure 9:
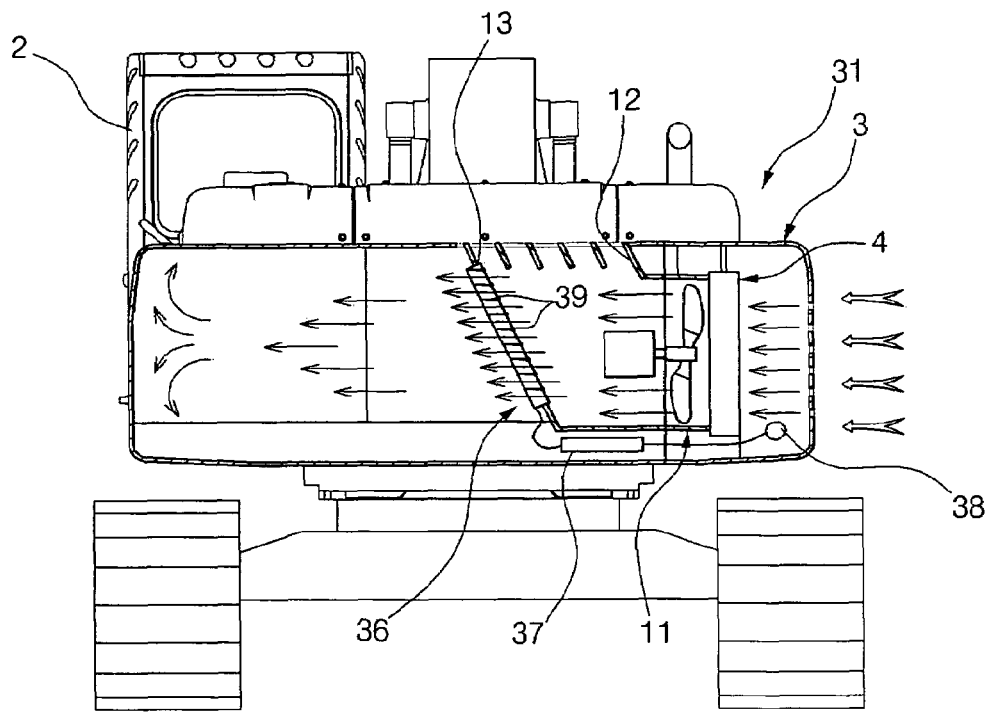
FIG. 9 is a rear view of a construction equipment provided with a heating apparatus for a cabin according to the third embodiment of the present invention.

FIG. 9 is a rear view of a construction equipment provided with a heating apparatus for a cabin according to the third embodiment of the present invention.

In the third embodiment, a switching means 36 provided in a heating apparatus 31 of the cabin 2 is different from those of the first and second embodiments. That is, the switching means 36 includes a plurality of wings 39 that are rotatably hinged on the duct 11.

Since the wings 39 of the switching means 36 are driven by an external control signal and are rotated in conjunction with one another, the air vent 13 of the duct 11 is opened if the wings are rotatably hinged in horizontal direction while the air vent 13 is closed if the wings are rotatably hinged in vertical direction. Thus, switching means of the third embodiment functions as those of the first and second embodiments.

The switching means 36 is connected with a controller 37, and the controller 37 is connected with a temperature sensor 38 that senses external air temperature. The controller 37 operates the wings 39 of the switching means 36 depending on the external air temperature to open and close the air vent 13. Therefore, the heating apparatus 31 of the cabin 2 can automatically be operated in response to temperature condition of the construction equipment.

Figure 10:
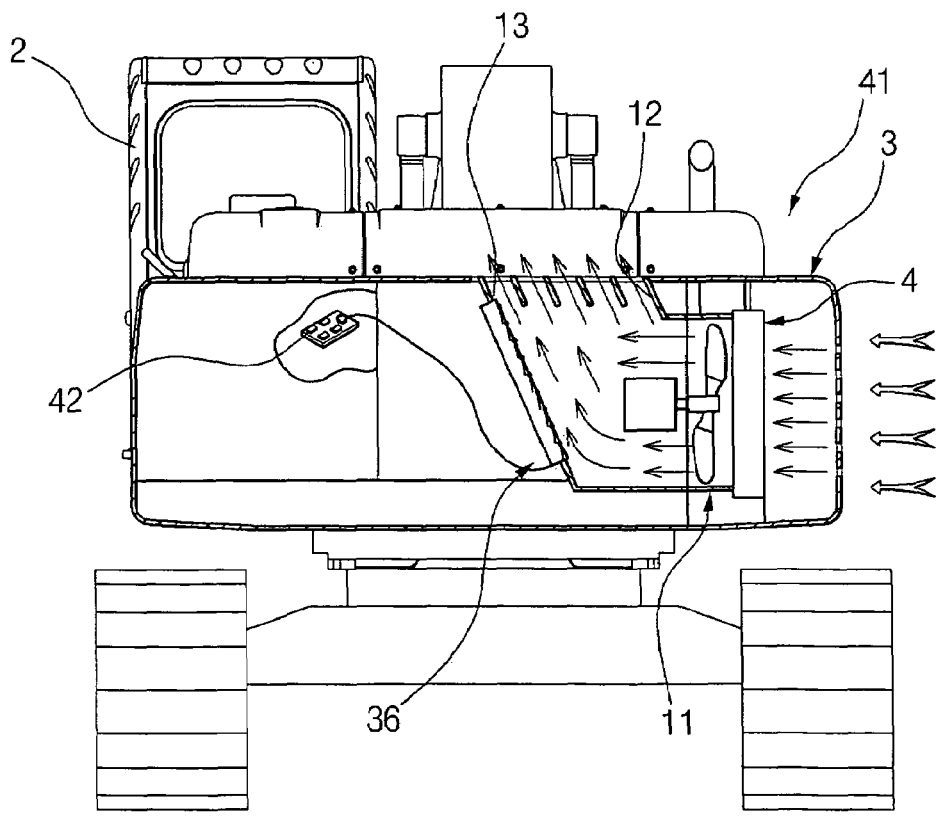
FIG. 10 is a rear view of a construction equipment provided with a heating apparatus for a cabin according to the fourth embodiment of the present invention.

FIG. 10 is a rear view of a construction equipment provided with a heating apparatus for a cabin according to the fourth embodiment of the present invention.

In the fourth embodiment, the switching means 36 provided in a heating apparatus 41 for the cabin is similar to that of the third embodiment. The switching means 36 of the fourth embodiment is different from that of the third embodiment in that the driver manipulates a switch 42 to operate the switching means 36.

The switching means 36 is connected with the switch 42 provided in the cabin 2, and a plurality of wings 39 of the switching means 36 are driven in conjunction with one another by the external control signal. The switch 42 may separately be provided to operate only the switching means 36 or may be provided to operate a heating system and a cooling system of the cabin 2 as well as the switching means 36.

Once the control signal is transmitted to the switching means 36 as the driver manipulates the switch 42, the wings 39 of the switching means 36 are rotatably hinged either in horizontal direction to open the air vent 13 of the duct 11 or in vertical direction to close the air vent 13. Thus, the switching means of the fourth embodiment functions as those of the first and second embodiments.

Therefore, if there is provided a separate switch that operates only the switching means 36, the driver can operate the switching means 36 by manipulating the switch depending on temperature condition inside the cabin 2 while driving the construction equipment. Also, if the switching means 36 is operated by the switch that operates the cooling system or the heating system, it is automatically operated in conjunction with the cooling system or the heating system to maximize cooling or heating efficiency of the cabin 2.

As described above, the heating apparatus for a cabin of a construction equipment according to the present invention has the following advantages.

Since the hot air ejected from the oil cooler can be used for heating in winter while it is ejected out in summer, cooling efficiency and heating efficiency of the cabin can be maximized.

Further, since the heating apparatus is automatically operated depending on its peripheral temperature condition, cooling or heating of the cabin can be made more efficiently.

Finally, there is convenience that hot air flow ejected from the oil cooler can be changed as the driver of the construction equipment manipulates the switch.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A heating apparatus for a cabin of a construction equipment provided with an oil cooler inside an automotive body at the rear of the cabin, comprising:

a duct connected to the oil cooler for guiding air flow ejected from the oil cooler, the duct including an inlet, an outlet having a grill, and an air vent, wherein the inlet of the duct is installed at the oil cooler opposite to the direction of hot air flow via the oil cooler provided from outside the automotive body so as to guide the hot air flow into the interior of the duct, the outlet of the duct is connected to the inlet so as to eject the hot air flow to the outside of the automotive body, and the air vent in the duct is formed between the inlet and the outlet so as to communicate the hot air flow provided in the interior of the duct toward the rear of the cabin; and switching means installed at the air vent of the duct selectively opens or closes the air vent for guiding the hot air flow ejected from the oil cooler to the rear of the cabin via the inlet to the rear of the cabin.

2. The heating apparatus for a cabin of a construction equipment according to claim 1, wherein the switching means is made of a plate material fixed to the duct by a fitting means.

3. The heating apparatus for a cabin of a construction equipment according to claim 1, wherein the switching means is made of a plate material rotatable hinged on the duct.

4. The heating apparatus for a cabin of a construction equipment according to claim 1, wherein the switching means includes at least one of more wings rotatable hinged on the duct.

5. The heating apparatus for a cabin of a construction equipment according to claim 3, wherein the switching means is connected with a controller to be driven by a control signal and the controller opens and closes the switching means depending on temperature information sensed by a temperature sensor.

6. The heating apparatus for a cabin of a construction equipment according to claim 3, wherein the switching means is connected with a switch provided in the cabin and is opened and closed as the switch is manipulated.

7. The heating apparatus for a cabin of a construction equipment according to claim 4, wherein the switching means is connected with a controller to be driven by a control signal and the controller opens and closes the switching means depending on temperature information sensed by a temperature sensor.

8. The heating apparatus for a cabin of a construction equipment according to claim 4, wherein the switching means is connected with a switch provided in the cabin and is opened and closed as the switch is manipulated.

9. A heating apparatus for a cabin of a construction equipment provided with an oil cooler inside an automotive body at the rear of the cabin, comprising:

a duct including an outlet that ejects air ejected from the oil cooler to the outside of the automotive body and an air vent that guides the air toward the rear of the cabin; and switching means provided in the air vent of the duct to open and close the air vent, guiding the air inside the duct to the rear of the cabin if the air vent is opened.

* * * * *